US006646552B1

(12) United States Patent
Lippert

(10) Patent No.: US 6,646,552 B1
(45) Date of Patent: Nov. 11, 2003

(54) GLOVE WITH A CONTACTLESS DATA CARRIER

(75) Inventor: Johannes Lippert, St. Wolfgang (AT)

(73) Assignee: SkiData AG, Gartenau (AT)

( * ) Notice: Subject to any disclaimer, the term of this patent is extended or adjusted under 35 U.S.C. 154(b) by 0 days.

(21) Appl. No.: 09/831,697

(22) PCT Filed: Sep. 27, 1999

(86) PCT No.: PCT/EP99/07169

§ 371 (c)(1),
(2), (4) Date: May 11, 2001

(87) PCT Pub. No.: WO00/30028

PCT Pub. Date: May 25, 2000

(30) Foreign Application Priority Data

Nov. 13, 1998 (DE) ..................................... 298 20 344 U

(51) Int. Cl.[7] .............................................. G08B 13/14
(52) U.S. Cl. ................. 340/572.1; 340/572.7; 340/572.8; 235/439; 235/462.25
(58) Field of Search .................... 340/572.1, 572.7, 340/572.8, 505, 686.6, 5.1; 235/462.25, 439; 104/173.2

(56) References Cited

U.S. PATENT DOCUMENTS

| | | | | |
|---|---|---|---|---|
| 4,453,161 A | * | 6/1984 | Lemelson .................. 340/5.63 |
| 5,003,637 A | | 4/1991 | Lonon ............................ 2/160 |
| 5,354,975 A | * | 10/1994 | Ishibashi et al. ............. 235/380 |
| 5,389,772 A | * | 2/1995 | McAllister .................. 235/441 |
| 5,446,265 A | * | 8/1995 | McAllister .................. 235/382 |
| 5,478,995 A | * | 12/1995 | Wallerstorfer et al. ...... 235/382 |
| 5,512,887 A | * | 4/1996 | McAllister .................. 340/5.7 |
| 5,715,555 A | | 2/1998 | Reber ............................ 8/158 |
| 5,905,248 A | * | 5/1999 | Russell et al. .............. 235/462 |
| 6,098,886 A | * | 8/2000 | Swift et al. ............. 235/472.01 |
| 6,224,548 B1 | * | 5/2001 | Gopinathan et al. ........ 600/300 |
| 6,248,064 B1 | * | 6/2001 | Gopinathan et al. ........ 600/300 |
| 6,412,699 B1 | * | 7/2002 | Russell et al. ......... 235/472.01 |

FOREIGN PATENT DOCUMENTS

| | | |
|---|---|---|
| DE | 195 30 391 A | 2/1997 |
| DE | 10103531 C1 * | 4/2002 |
| JP | 10-082223 | 3/1998 |
| WO | 94/25939 | 5/1994 |

* cited by examiner

Primary Examiner—Toan N Pham
(74) Attorney, Agent, or Firm—Flynn, Thiel, Boutell & Tanis, P.C.

(57) ABSTRACT

A data carrier for contactless control of persons upon utilization of a service in skiing areas, which has a chip (4) with an antenna (5), is disposed in a glove (1).

6 Claims, 1 Drawing Sheet

GLOVE WITH A CONTACTLESS DATA CARRIER

This invention relates to the use of a glove with a contactless data carrier.

Compared to data carriers which must be inserted into a control device, contactless-type data carriers which cooperate with a reader or read-write device in the radio wave range over a relatively great data transfer distance have the advantage that they can be worn e.g. on the anorak e.g. in the form of a card or integrated into a wristwatch, i.e. can be used "hand-free". They are therefore preferably used at access controls of ski lifts and cable cars which generally have a person singling device such as a turnstile operated or unblocked by the reader or read-write device when the read-write device receives suitable data from the data carrier (cf. WO 94/25939).

So that it cannot go astray during skiing the data carrier is generally fastened to the anorak or kept in an anorak pocket. One is therefore more or less forced to keep one's anorak or other outer garment on for access control even when one would actually rather take it off. Data carriers integrated into wristwatches, on the other hand, are relatively costly.

DE 195 30 391A discloses a read-write device for transponders which are used for the stockkeeping e.g. of gas cylinders. To simplify reading and writing of the transponder, an antenna and a switch are provided in the palm side of a glove, the switch being connected with the read-write device via a cable. Patent Abstracts of Japan vol. 198, no. 08, Jun. 30, 1998, and JP 10 082223 A disclose a car burglarproof device using a transponder in a garment of the driver, for example in the glove. When the engine speed exceeds a certain value the transponder transmits an identification code which is received by a receiver on the vehicle. If the received code does not match the stored code, the fuel supply is interrupted.

The problem of the invention is to provide a contactless data carrier for skiers which hardly causes additional costs without causing any feelings of disturbance.

This is obtained according to the invention by the measures of claim 1. Ski gloves protect from cold and from hand injuries. They are therefore among the articles of clothing which a skier virtually always has with him.

Contactless data carriers comprising a carrier plate with a chip and antenna are commercially available as mass products at low cost. Since substantially only such a data carrier is used without major changes which need only be fastened to a conventional ski glove according to the invention, hardly any additional costs are caused for the glove by the data carrier.

The chip with the antenna is preferably encapsulated in a small plastic carrier plate. This protects it excellently from environmental influences as well as mechanical stress. The chip with the antenna can for this purpose be integrally cast or injection molded in the plate. The plate can have a thickness of for example 1 to 3 mm and a diameter of e.g. 2 to 4 cm. It is preferably of round, in particular circular, form, having in any case rounded corners to avoid damage to the glove or injuries. The antenna, which is preferably formed as a coil, extends in the edge area of the plate.

The plastic carrier plate is preferably disposed in the area of the back of the glove since it is least disturbing there and this area remains free even when the skier is holding his ski poles when passing through the control device.

Sport clothing is nowadays often given visible technicity by the incorporation of basically clothing-unrelated technical devices in order to increase its value outwardly. The plastic carrier plate with the encapsulated chip and antenna are very suitable for this. For this purpose the ski glove is preferably provided on its outer side in the area of the back of the hand with a window-shaped gap in which the carrier plate with the chip and antenna is disposed. In order to make the encapsulated chip and antenna visible in the recess the carrier plate is of transparent design. It can thus be formed for example from polyacrylate, polycarbonate, polyethylene terephthalate, polyethylene or similar transparent plastic.

The gap is provided in the surface material of the glove which can be for example a textile material, leather or a foil. For fastening the carrier plate in the gap in the surface layer, the carrier plate can have at the edge at least one extension with which it is fastened to the surface material and/or to one or more layers under the surface material. Said layer or layers under the surface material can consist of textile material or a foil. They can also be breathable, water-impermeable layers, for example foils provided with micropores e.g. of polytetrafluoroethylene or similar fluorine-containing plastics.

The extension on the carrier plate is covered by the surface material. It can be formed by one or more tabs, or by a flange. The extension can be formed by suitable openings to be sewn onto the surface material and/or the layer or layers under the surface material. The carrier plate can for example also be fastened by welding or gluing the extension to the layer of the glove under the surface material or to the lower side of the surface material. If the carrier plate is welded or glued to the layer under the surface material, the extension can also be omitted completely.

The ski glove which is provided with the contactless data carrier according to the invention can have any structure. However, it preferably has a filling layer under the carrier plate so that the carrier plate does not press on the hand. The ski glove can be a glove or a mitten.

To seal the glove in the area of the gap in the surface material, the surface material preferably lies close against or on the edge area of the carrier plate; it can optionally also be glued or welded to the carrier plate.

In the following an embodiment of the inventive data carrier will be explained in more detail by way of example with reference to the drawing, in which.

Figure 1:
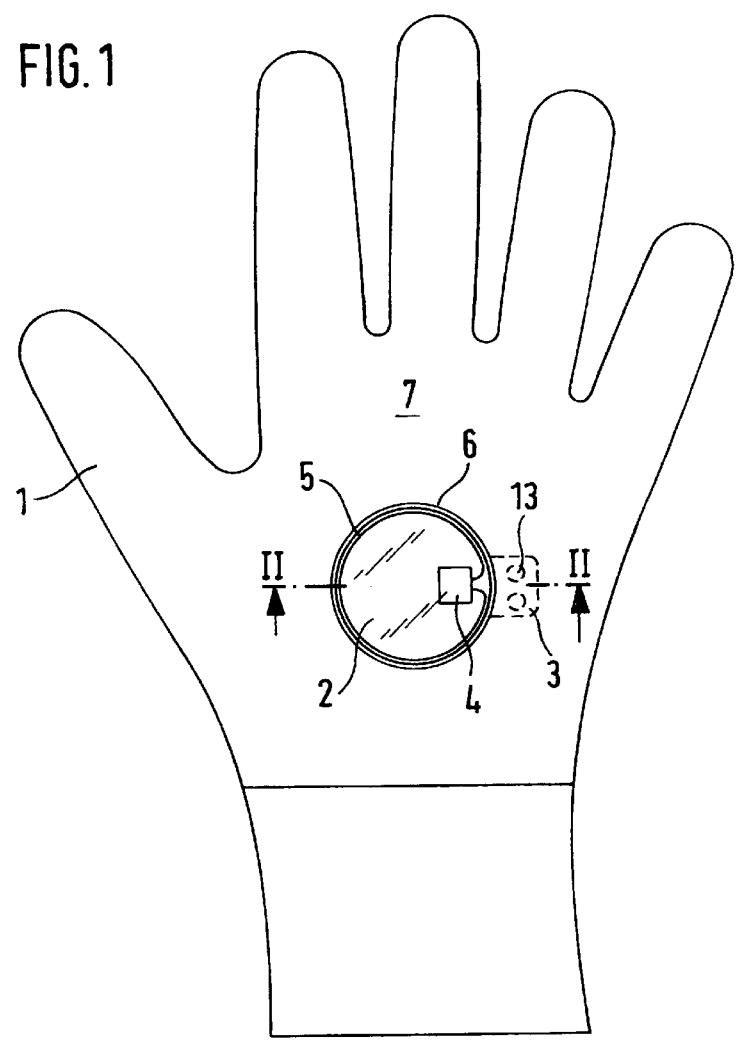
FIG. 1 shows a top view of a ski glove.

Thus, carrier plate 2 made of transparent plastic is fastened to the back of ski glove 1. Carrier plate 2, which can have for example a thickness of 3 mm, is provided on the circumference with tab-shaped extension 3 which with its thickness of for example 0.2 to 1 mm is formed thinner than plate 2. The contactless data carrier, i.e. chip 4 with bonded antenna coil 5, is encapsulated in carrier plate 2. Carrier plate 2 is of round form, as is antenna coil 5 extending in the edge area of carrier plate 2.

Carrier plate 2 is disposed in gap 6 in surface material 7 of glove 1. Extension 3 is covered by surface material 7 and therefore shown by a dashed line in FIG. 1.

Figure 2:
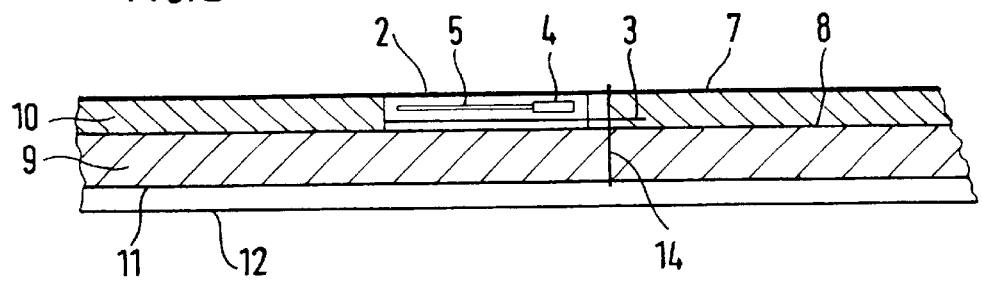
FIG. 2 shows a section through the upper side of the glove along line II—II in FIG. 1 in an enlarged view.

In accordance with FIG. 2, glove 1 has surface material 7, carrier layer 8 and soft cushion layer 9. In addition, filling layer 10 can be provided between surface material 7 and carrier layer 8, and under cushion layer 9 for example breathable, waterproof interlayer 11, for example consisting of a foil with micropores, and thereunder inside layer 12, for example a fine fabric.

Surface layer 7 can consist for example of leather, a foil or a textile material such as felt or a fabric. Carrier layer 8 can be a textile material, for example felt or a fabric, or a foil. Extension 3 provided with suitable holes 13 is used for sewing plate 2 to carrier layer 8 and/or surface layer 7 as well as optionally also to interlayer 12, as shown schematically by seam 14 in FIG. 2. Surface layer 7 lies with the edge of its gap 6 close against plate 2.

What is claimed is:

1. A glove assembly for use with an access control system for a ski lift or a cable car, the access control system having a data reader, said glove assembly including:
   - a glove body having a back section, said glove body formed from an inner layer of material located adjacent a hand on which said glove assembly is worn, and a surface layer that extends over said inner layer that is distal from the hand and said surface layer is formed in the back section to define a gap;
   - a carrier plate attached to the back section of said glove body, said carrier plate disposed in the gap of the back section of said glove and formed to have an extension tab that extends between said inner layer said surface layer;
   - a securing member extending between said carrier plate extension tab and to at least one of said surface layer or said inner layer of said glove body for securing said carrier plate to said glove body; and
   - a contactless data carrier for transmitting data to the access control system reader, said contactless data carrier including a chip and antenna that are mounted to said carrier plate.

2. The glove assembly of claim 1, wherein said chip and said antenna are encapsulated in said carrier plate.

3. The glove assembly of claim 1, wherein said carrier plate is formed from transparent material.

4. The glove assembly of claim 1, wherein said chip and said antenna are encapsulated in said carrier plate and said carrier plate is formed from transparent material.

5. A glove assembly for use with an access control system having a data reader, said glove assembly including:
   - a glove body having a back section, said glove body formed from an inner layer of material located adjacent a hand on which said glove assembly is worn and a surface layer which extends over said inner layer that is distal from the hand, wherein said surface layer is formed to define a gap;
   - a carrier plate attached to the back section of said glove body, said carrier plate disposed in the gap of the back section of the glove, and said carrier plate is formed to have an extension tab that extends between said inner layer and said surface layer;
   - a securing member extending between said carrier plate extension tab and to at least one of said surface layer or said inner layer of said glove body for securing said carrier plate to said glove body; and
   - a contactless data carrier for transmitting data to the access control system reader, said contactless data carrier including a chip and antenna which are mounted to and encapsulated in said carrier plate.

6. The glove assembly of claim 5, wherein said carrier plate is formed from a transparent material.

* * * * *